United States Patent [19]

Rouéche et al.

[11] 4,012,371
[45] Mar. 15, 1977

[54] BENZINALDAZOLYL-, QUINOLONYL-, OR PHENMORPHOLONYLAZO-3-CYANO-4-METHYL-1,2-[1',2']-BENZ-[4',5']-IMIDAZOLO-6-HYDROXYPYRIDINE COLORANTS

[75] Inventors: Armand Rouéche, Bottmingen; Francois L'Eplattenier, Therwil, both of Switzerland

[73] Assignee: Ciba-Geigy Corporation, Ardsley, N.Y.

[22] Filed: Mar. 10, 1975

[21] Appl. No.: 556,744

[30] Foreign Application Priority Data

Mar. 12, 1974 Switzerland .................. 3417/74

[52] U.S. Cl. .................. 260/155; 106/28; 106/248; 106/288 Q; 106/300; 106/308 F; 106/300 Q; 260/37 R; 260/37 P; 260/40 R; 260/40 P; 260/42.21; 260/140 R; 260/141; 260/144; 260/154; 260/156; 260/247.5 GP; 260/251 QA; 260/251 QB; 260/288 R; 260/293.69; 260/307 R; 260/308 R; 260/309.2

[51] Int. Cl.² .................. C09B 29/36; D06P 1/08
[58] Field of Search .................. 260/156, 155

[56] References Cited

UNITED STATES PATENTS 2,742,457  4/1956  Rudner .................. 260/156
3,420,813  1/1969  Mueller et al. .................. 260/156

FOREIGN PATENTS OR APPLICATIONS 2,023,295  11/1971  Germany .................. 260/156

*Primary Examiner*—Floyd D. Higel
*Attorney, Agent, or Firm*—Vincent J. Cavalieri

[57] ABSTRACT

Azo colorants of the formula

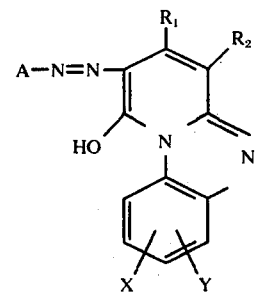

wherein A denotes the radical of a heterocyclic diazo component, $R_1$ denotes a hydroxyl, alkyl, phenyl or alkoxycarbonyl group, $R_2$ denotes a H atom or an alkyl, phenyl, acyl, nitrile, alkoxycarbonyl or carbamoyl group, and X and Y denote substituents which do not confer solubility in water are prepared. The compounds are useful for pigmenting high molecular weight organic materials, such as polyesters, polyolefins and rubber. The compounds have excellent fastness to light, weathering and migration.

4 Claims, No Drawings

BENZINALDAZOLYL-, QUINOLONYL-, OR PHENMORPHOLONYLAZO-3-CYANO-4-METHYL-1,2-[1',2']-BENZ-[4',5']-IMIDAZOLO-6-HYDROXYPYRIDINE COLORANTS

It has been found that valuable, new azo colorants of the formula

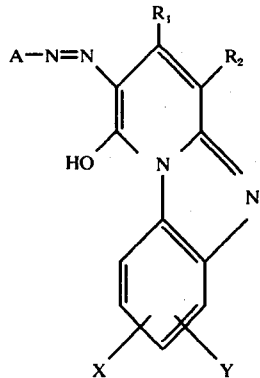

wherein A denotes the radical of a heterocyclic diazo component, $R_1$ denotes a hydroxyl, alkyl, phenyl or alkoxycarbonyl group, $R_2$ denotes a hydrogen atom or an alkyl, acyl, phenyl, nitrile, alkoxycarbonyl or carbamoyl group, and X and Y denote substituents which do not confer solubility in water, are obtained if the diazo compound of a heterocyclic amine is coupled with a coupling component of the formula

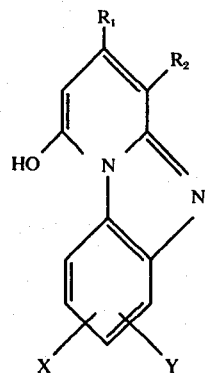

Preferred colorants are those of the formula I wherein A denotes the radical of a 5-membered to 6-membered heterocyclic amine having a fused benzene nucleus, and particularly denotes a radical of the formula

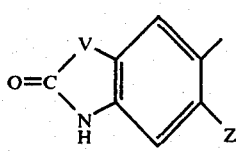

wherein V denotes an O or S atom or an imino group, and Z denotes a H atom or halogen atom, or an alkyl or alkoxy group containing 1–4 C atoms.

Quinolone radicals of the formula

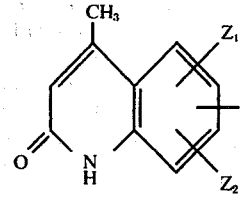

wherein $Z_1$ and $Z_2$ denote H atoms or halogen atoms, or alkyl or alkoxy groups, containing 1–4 C atoms, or phenmorpholone radicals of the formula

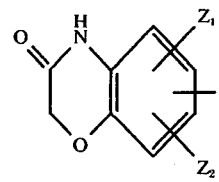

wherein $Z_1$ and $Z_2$ have the meaning indicated, are also of particular interest.

In formula I, $R_1$ preferably denotes a hydroxyl group or an anlkyl group containing 1–4 C atoms, an alkoxycarbonyl group containing 2–6 C atoms, or a phenyl group which is optionally substituted by halogen atoms or alkyl or alkoxy groups containing 1–4 C atoms, and $R_2$ denotes a H atom, a nitrile group, an alkyl group containing 1–4 C atoms, an alkylcarbonyl, alkoxycarbonyl or alkylcarbamoyl group containing 2–6 C atoms, or a phenyl or phenylcarbamoyl group which is optionally substituted by halogen atoms or alkyl or alkoxy groups containing 1–4 C atoms. X and Y preferably denote H atoms or halogen atoms, alkyl or alkoxy groups containing 1–4 C atoms, or alkoxycarbonyl groups containing 2–6 C atoms.

The diazo components which are used are, for example, those of the formula

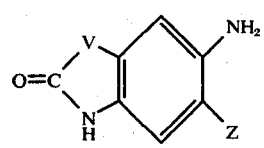

wherein V and Z have the meaning indicated.

The following may be mentioned as examples of amines of the formula (VI): 5-aminobenzoxazolone, 4-aminobenzoxazolone, 6-aminobenzoxazolone, 5-amino-6-chloro-benzoxazolone, 5-amino-7-chloro-benzoxazolone, 5-amino-6-bromo-benzoxazolone, 5-amino-7-bromo-benzoxazolone, 5-amino-6-methyl-benzoxazolone, 5-amino-7-methyl-benzoxazolone, 5-amino-6-methoxy-benzoxazolone, 5-amino-7-methoxy-benzoxazolone, 6-amino-benzthiazolone, 6-amino-5-chlorobenzoxazolone, 6-amino-5-methyl-benzoxazolone, 5-amino-benzimidazolone, 4-amino-benzimidazolone, 5-amino-6-chloro-benzimidazolone, 5-amino-7-chloro-benzimidazolone, 5-amino-7-bromo-benzimidazolone, 5-amino-6-methyl-benzimidazolone, 5-amino-7-methoxy-benzimidazolone, 5-amino-6-ethoxy-benzimidazolone, 5-amino-1-phenyl-benzimidazolone, 5-amino-1-(4'-chlorophenyl)-benzimidazolone, 5-amino-1-(4'-methylphenyl)benzimidazolone, 5-amino-1-(4'-methoxyphenyl)-benzimidazolone, 5-amino-1(2'-chlorophenyl)-benzimidazolone, 5-amino-1-(2'-methoxyphenyl)-benzimidazolone, 5amino-1-(2'-methyl-4'-chlorophenyl)-benzimidazolone, 5-amino-1-phenyl-6-chloro-benzimidazolone, 5-amino-1-phenyl-7-chloro-benzimidazolone, 7-amino-4-methyl-2-hydroxyquinolone, 7-amino-2-methyl-4-hydroxyquinoline, 8-amino-4-hydroxyquinoline, 8-amino-2-hydroxyquinoline, 8-amino-6-methoxy-2-hydroxyquinoline, 8-amino-2-methyl-4-hydroxyquinoline, 5-amino-2,3-dihydroxyquinazoline, 5-amino-7-chloro-2,3-dihydroxyquinazoline, 5-amino-7-methyl-2,3-dihydroxyquinazoline, 5-amino-2-methyl-4-hydroxyquinazoline, 5-amino-2-phenyl-4-hydroxyquinazoline, 5-amino-2-hydroxyquinazoline, 6-amino-2-phenyl-4-hydroxyquinazoline, 6-amino-2,4-dihydroxyquinazoline, 7-amino-2,4-dihydroxyquinazoline, 2-(4'-aminophenyl)-quinazolone-4, 2-(3'-amino-4'-chlorophenyl)-quinazolone-4, 2-(3'-amino-4'-amino-4'-methylphenyl)-quinazolone-4, 2-(3'-amino-4'-methoxyphenyl)-quinazolone-4, 4-(4'-aminophenylamino)-quinazolone-2, 4-(4'-amino-3'-chlorophenylamino)-quinazolone-2,4-(4'-amino-3',6'-dimethoxyphenylamino)-quinazolone-2, 4-(4'-amino-3'-chloro-6'-methoxyphenylamino)-quinazolone-2,3-amino-naphthalimide, 4-amino-naphthalimide, 3-amino-naphthalic acid methylimide, 3-amino-napthalic acid phenylimide, 2-aminoacridone, 4-amino-2-methylacridone, 3-amino-6-chloroacridone, 1-amino-4-methylacridone, 2-amino-7-methoxyacridone, 2-amino-7-ethoxyacridone, 5-amino-phenmorpholone-(3), 6-amino-phenmorpholone-(3), 6-amino-8-chlorophenmorpholone-(3), 7-amino-phenmorpholone-(3), 7-amino-6-chlorophenmorpholone-(3), 7-amino-6-methoxyphenmorpholone-(3), 7-amino-6-methylphenmorpholone-(3), 4-methyl-6-amino-quinolone-2, 4-methyl-6-amino-7-chloro-quinolone-2, 4-methyl-6-amino-8-chloro-quinolone-2, 4,7-dimethyl-6-amino-quinolone-2, 4,8-dimethyl-6-amino-quinolone-2,4,5,8-trimethyl-6-amino-quinolone-2,4-methyl-6-amino-7-methoxy-quinolone-2,4-methyl-6-amino-5,8-dimethoxy-quinolone-2,4-methyl-7-amino-quinolone-2,4-methyl-7-amino-6-chloro-quinolone-2,4,6-dimethyl-7-amino-quinolone-2,4,8-dimethyl-7-amino-quinolone 2 and 4-methyl-7-amino-6-methoxy-quinolone-2.

The coupling components of the formula II are appropriately obtained according to known processess by condensation of a benzimidazole of the formula

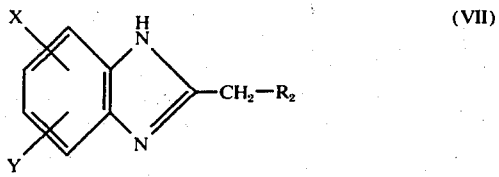

(VII)

wherein R₂, X and Y have the meaning indicated, with an acylacetic ester of the formula

R₁COCH₂COOR (VIII)

wherein R denotes an alkyl group containing 1–4 C atoms, and R₁ has the meaning indicated.

The following may be mentioned as examples of acylacetic esters: acetoacetic acid methyl ester, acetoacetic acid ethyl ester, benzoylacetic acid ethyl ester and oxalacetic acid diethyl ester.

The following may be mentioned as benzimidazoles: 2-cyanomethyl-benzimidazole, 2-cyanomethyl-4-chloro-benzimidazole, 2-cyanomethyl-5-chloro-benzimidazole, 2-cyanomethyl-5,6-dichloro-benzimidazole, 2-cyanomethyl-4-chloro-6-methyl-benzimidazole, 2-cyanomethyl-5-methoxy-benzimidazole, 2-cyanomethyl-6-ethoxy-benzimidazole, benzimidazolyl-2-acetic acid amide, benzimidazolyl-2-acetic acid methylamide, benzimidazolyl-2-acetic acid phenylamide, benzimidazolyl-2-acetic acid methyl ester, benzimidazolyl-2-acetic acid ethyl ester, benzimidazolyl-2-acetic acid phenyl ester, 2-ethyl-benzimidazole, 2-benzyl-benzimidazole, 2-cyanomethyl-6-trifluoromethyl-benzimidazole and 2-acetonyl-benzimidazole.

The coupling is appropriately carried out by gradually adding the aqueous-alkaline solution of the coupling component to an acid solution of the diazonium salt. The coupling is appropriately carried out at a pH-value of 4–6.

The pH-value is advantageously adjusted by adding a buffer. Examples of possible buffers are the salts, particularly alkali metal salts, of formic acid, phosphoric acid or, particularly, acetic acid. The alkaline solution of the coupling component appropriately contains a wetting agent, dispersing agent or emulsifier, for example an aralkylsulphonate, such as dodecylbenzenesulphonate or the sodium salt of 1,1'-dinaphthylmethanedisulphonic acid, polycondensation products of alkylene oxides, such as the reaction product of ethylene oxide and p-tert.-octylphenol, and also alkyl esters of sulphoricinoleates, for example n-butyl sulphoricinoleate. The dispersion of the coupling component can also advantageously contain protective colloids, for example methylcellulose or minor amounts of inert solvents which are insoluble or sparingly soluble in water, for example optionally halogenated or nitrated aromatic hydrocarbons, such as benzene, toluene, xylene, chlorobenzene, dichlorobenzenes or nitrobenzene, and aliphatic halogenated hydrocarbons, such as, for example, carbon tetrachloride or trichloroethylene, and also organic solvents which are miscible with water, such as acetone, methyl ethyl ketone, methanol, ethanol or isopropanol, or, particularly, dimethylformamide.

The coupling can also be advantageously carried out by continuously combining, in a mixing jet, an acid solution of the diazonium salt with an alkaline solution of the coupling component, in the course of which an immediate coupling of the components takes place. The resulting colorant dispersion is continuously withdrawn from the mixing jet and the colorant is separated off by filtration.

Instead of the diazonium salts, the corresponding diazoamino compounds can also be used. These are obtained by known processes by coupling an aryldiazonium salt with a primary, or preferably a secondary, amine. The most diverse amines are suitable for this purpose, for example aliphatic amines, such as methylamine, ethylamine, ethanolamine, propylamine, butylamine, hexylamine and, particularly, dimethylamine, diethylamine, diethanolamine, methyl ethanolamine, dipropylamine or dibutylamine, aminoacetic acid, methylaminoacetic acid, butylaminoacetic acid, aminoethanesulphonic acid, methylaminoethanesulphonic acid, guanylethanesulphonic acid and β-amino-ethylsulphuric acid, alicyclic amines, such as cyclohexylamine, N-methylcyclohexylamine and dicyclohexylamine, aromatic amines, such as 4-aminobenzoic acid, sulphanilic acid, 4-sulpho-2-aminobenzoic acid, (4-sulphophenyl)-guanidine, 4-N-methylaminobenzoic acid, 4-ethylaminobenzoic acid, 1-aminonaphthalene-4-sulphonic acid and 1-aminonaphthalene-2,4-disulphonic acid, heterocyclic amines, such as piperidine, morpholine, pyrrolidine and dihydroindole, and, finally, also sodium cyanamide or dicyandiamide.

As a rule the diazoamino compounds obtained are sparingly soluble in cold water and can, where appropriate, be separated off in a crystallised form from the reaction medium by salting out. In many cases the moist press cakes can be used for further reactions. In some cases it can prove advisable to dehydrate the diazoamides by vacuum drying prior to the reaction.

The coupling of the diazoamino compound with the coupling component is carried out in an organic solvent, for example chlorobenzene, o-dichlorobenzene, nitrobenzene, pyridine, ethylene glycol, ethylene glycol monoethyl or monomethyl ether, dimethylformamide, formic acid or acetic acid. When using solvents which are miscible with water, it is not necessary to use the diazoamino compounds in an anhydrous form. For example, suction filter cakes which are moist with water can be used.

The coupling is appropriately carried out hot, preferably at temperatures between 80° and 180° C, and in an acid medium and it generally proceeds very rapidly and completely. If neutral solvents are used, it is advantageous to add an acid, for example hydrogen chloride, sulphuric acid, formic acid or acetic acid. By virtue of their insolubility, the resulting pigments can be isolated from the reaction mixture by filtration. An after-treatment with organic solvents, such as is required in the case of pigments which are obtained by the aqueous coupling route, is therefore unnecessary in most cases.

Finally, the coupling can also be carried out by suspending the amine to be diazotised, together with the coupling component, in a molar ratio of 1:1 in an organic solvent and treating the mixture with a diazotising agent, particularly an ester of nitrous acid, such as methyl, ethyl, butyl, amyl or octyl nitrite.

The resulting azo colorants can be employed for the most diverse purposes, for example for colouring hydrophobic, synthetic textile fibres from an aqueous dispersion, for example for colouring cellulose diacetate to triacetate, but particularly for colouring high-molecular esters of aromatic polycarboxylic acids and polyfunctional alcohols, for example polyalkylene glycol terephthalates. The colorants can, however, also be used for colouring synthetic polyamide fibres.

The colouring is carried out by the customary processes.

The colorants obtained are, however, of particular interest for pigmenting high-molecular organic material such as cellulose ethers and esters, such as ethylcellulose, nitrocellulose, cellulose acetate and cellulose butyrate, polyamides or high molecular polyurethanes or polyesters, natural resins or synthetic resins, such as polymerisation resins or condensation resins, for example aminoplasts, particularly urea-formaldehyde and melamine-formaldehyde resins, alkyd resins, phenoplasts, polycarbonates, polyolefines, such as polystyrene, polyvinyl chloride, polyethylene, polypropylene, polyacrylonitrile and polyacrylic acid esters, rubber, casein, silicone and silicone resins, on their own or as mixtures.

In this it is immaterial whether the high-molecular compounds mentioned are present as plastic compositions or melts or in the form of spinning solutions, lacquers or paints. The new pigments are found to be particularly suitable for use as printing inks. Depending on the end use, it is found to be advantageous to use the new pigments as toners or in the form of preparations. Besides the pure pigment, the preparations can additionally contain, for example, natural resins, for example abietic acid or esters thereof, ethylcellulose, cellulose acetobutyral, alkaline earth metal salts of higher fatty acids, fatty amines, for example stearylamine or rosin amine, vinyl chloride-vinyl acetate copolymers, polyacrylonitrile or polyterpene resins or watersoluble dyestuffs, for example dyestuff sulphonic acids or alkaline earth metal salts thereof.

The new colorants are also suitable for use as photoelectric toners.

German Offenlegungsschrift No. 2,023,295 describes, inter alia, a colorant wherein A denotes, in accordance with formula I, the radical of 2-aminobenzthiazole, $R_1$ denotes a methyl group and $R_2$ denotes a nitrile radical. This compound, however, does not display any pigment character and is fast neither to light nor to weathering nor to migration, in contrast to the compound according to the invention, of Example 1, in which A represents the radical of 5-aminobenzimidazolone and $R_1$ and $R_2$ represent the same substituents as above.

In the examples which follow, unless otherwise specified, the parts denote parts by weight and the percentages denote percentages by weight.

EXAMPLE 1

1.5 parts of 5-aminobenzimidazolone are diazotised in the customary manner in water using 30% strength hydrochloric acid and 4N sodium nitrite solution. The solution thus obtained is then treated with 15 parts of crystalline sodium acetate.

A solution of 2.3 parts of 3-cyano-4-methyl-1,2-[1',-2']-benz-[4',5'-]imidazolo-6-hydroxypyridine (dissolved in 30 ml of dimethylformamide, 50 ml of ethanol, 30 ml of water and 5 parts of 30% strength NaOH solution) is added dropwise over the course of 15 minutes, at a temperature of 5° to 10° C at a pH-value of 4 to 5.

The suspension of pigment thus obtained is stirred for a further hour at room temperature, heated at 80° – 90° C and stirred for a further half hour at this temperature. The resulting pigment suspension is filtered and the product is washed with hot water until free from salt.

After drying at 90° C, 3.3 parts are obtained of a red-claret-coloured, soft-grained powder of the formula

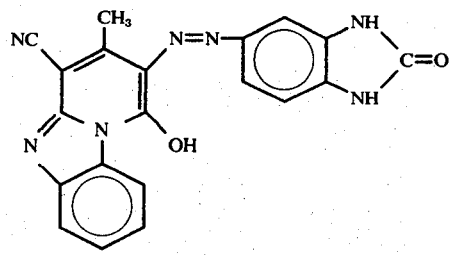

Combustion analysis

| Combustion analysis: | | | |
|---|---|---|---|
| Theory: | C 62.6 % | Found: | 61.9% |
| | H 3.42% | | 3.6% |
| | N 25.58% | | 24.8% |

The colorant colours polyvinyl chloride in claret-red shades with good fastness to light and migration.

The table which follows lists further colorants which are obtained if the diazo compound mentioned in column I is diazotised, according to the instructions of Example 1, and coupled with the coupling component listed in column II. Column III indicates the shade of a 0.2% strength coloration achieved with the colorant in PVC.

| Example | Diazo component | Coupling component | Shade |
|---|---|---|---|
| 2 | 4,8-Dimethyl-7-amino-quinolone-2 | [structure: pyridine with CH₃, CN, OH substituents fused to benzimidazole] | Red |
| 3 | 5-Amino-6-chlorobenz-imidazolone | " | Red |
| 4 | 5-Amino-6-methylbenz-imidazolone | " | Claret |
| 5 | 7-Amino-6-methylphen-morpholone-(3) | " | Claret |
| 6 | 4-Methyl-7-amino-quinolone-2 | " | Red |
| 7 | 4,6-Dimethyl-7-amino quinolone-2 | " | Red |
| 8 | 4-Methyl-6-chloro-7-amino-quinolone-2 | " | Red |
| 9 | 4-Methyl-6-amino-7-chloro-quinolone-2 | " | Red |
| 10 | 5-Amino-benzoxazolone | " | Brown |
| 11 | 7-Amino-quinazolone-2 | " | Red |
| 12 | 5-Amino-6-methoxybenz-imidazolone | " | Violet |
| 13 | 5-Amino-1-(N-methyl)-benzimidazoline | [structure: pyridine with CH₃, CN, OH substituents fused to benzimidazole] | Violet |
| 14 | 5-Amino-1-(N-phenyl)-benzimidazolone | " | Red |
| 15 | 7-Amino-phenmorpholone-(3) | " | Red |
| 16 | 7-Amino-6-chloro-phen-morpholone-(3) | " | Claret |
| 17 | 2-(4'-Aminophenyl)-4(3H)-quinazolone | " | Red |
| 18 | 2-(3'-Amino-4'-chloro-phenyl)-4(3H)-quinazolone | " | Orange |
| 19 | 2-(3'-Amino-4'-methyl-phenyl)4(3H)-quinazolone | " | Red |
| 20 | 2-(3'-Aminophenyl)-4(3H-quinazolone | " | Orange |
| 21 | 2-Methyl-3-(4'-amino-phenyl)-4(3H)-quinazoli-none | " | Orange |
| 22 | 2-(4'-Aminophenyl)-5-phenyl-triazole(1,3,4) | " | Red |

-continued

| Example | Diazo component | Coupling component | Shade |
|---|---|---|---|
| 23 | 5-Amino-benzimidazolone | *(structure: 4,6-dihydroxy-3-cyano-pyridine coupled via N to phenyl imine)* | Brown |
| 24 | 4-Methyl-6-amino-7-chloro-quinolone-2 | *(structure: pyrido-fused system with OH, CN, HO groups)* | Brown |
| 25 | 5-Amino-benzimidazolone | *(structure: pyrido-benzimidazole with OH, CN, HO, CH₃)* | Brown |
| 26 | 4-Methyl-7-amino-quinolone-2 | " | Brown |
| 27 | 5-Amino-benzimidazolone | *(structure: pyridine with CH₃, CONH₂, HO fused to benzimidazole)* | Brown |
| 28 | 4,8-Dimethyl-7-amino-quinolone-2 | " | Red |
| 29 | 8-Amino-quinazolone-4 | " | Orange |
| 30 | 8-Amino-4-methyl-quinolone-2 | " | Red |

-continued

| Example | Diazo component | Coupling component | Shade |
|---|---|---|---|
| 31 | 5-Amino-benzimidazolone | ![structure with CH₃, COCH₃, HO, N, N] | Brown |
| 32 | 4-Methyl-7-amino-quinolone-2 | " | Yellow |
| 33 | 6-Methyl-5-amino-benzimidazolone | " | Claret |
| 34 | 4-Methyl-6-amino-7-chloro-quinolone-2 | " | Brown |
| 35 | 7-Amino-6-methyl-phenmorpholone-(3) | " | Brown |
| 36 | 7-Amino-quinazolone-4 | " | Yellow |
| 37 | 5-Amino-benzimidazolone | ![structure with C₆H₅, CN, HO, N, N] | Violet |
| 38 | 4-Methyl-7-amino-quinolone-2 | " | Red |
| 39 | 4,8-Dimethyl-7-amino-quinolone-2 | " | Red |
| 40 | 7-Amino-6-methyl-phenmorpholone-(3) | " | Violet |
| 41 | 5-Chloro-6-amino-benzoxazolone | ![structure with C₆H₅, CN, HO, N, N] | Brown |
| 42 | 5-Amino-benzimidazolone | ![structure with OH, C₆H₅, HO, N, N] | Brown |
| 43 | 4-Methyl-7-amino-quinolone-2 | " | Brown |
| 44 | 4-Methyl-7-amino- | | Yellow |

-continued

| Example | Diazo component | Coupling component | Shade |
|---|---|---|---|
| | quinolone-2 | (structure: 4-methyl-6-hydroxy pyrido-benzimidazole) | |
| 45 | 5-Amino-benzimidazolone | " | Red |
| 46 | 5-Amino-6-methyl-benzimidazolone | " | Violet |
| 47 | 4-Methyl-6-chloro-7-aminoquinolone-2 | " | Yellow |
| 48 | 5-Amino-benzimidazolone | (structure with COOC$_2$H$_5$ and CN) | Claret |

EXAMPLE 49

65 parts of stabilised polyvinyl chloride, 35 parts of dioctyl phthalate and 0.2 part of the colorant obtained in accordance with Example 1 are stirred with one another and are worked on a two-roll calender for 7 minutes at 140° C. This gives a film which is coloured a pure claret shade and which has very good fastness to light and migration.

EXAMPLE 50

1.00 g of the pigment prepared according to Example 2 is finely ground on an Engelsmann grinding machine with 4.00 g of printer's varnish of the composition:
  29.4% of linseed oil stand oil (300 poise),
  67.2% of linseed oil stand oil (20 poise),
  2.1% of cobalt octoate (8% of Co) and
  1.3% of lead octoate (24% of Pb)
and is then printed, at 1 g/m$^2$, onto art paper with the aid of a block using the letterpress process. This gives a strong, pure red shade having good transparency and good gloss.

The pigment is also suitable for use in other printing processes, such as gravure printing, offset printing and flexographic printing and here too gives very good results.

EXAMPLE 51

10 g of titanium dioxide and 2 g of the pigment prepared in accordance with Example 1 are ground for 48 hours in a ball mill together with 88 g of a mixture of 26.4 g of coconut alkyd resin, 24.0 g of melamine-formaldehyde resin (50% solids content), 8.8 g of ethylene glycol monomethyl ether and 28.8 g of xylene.

If this lacquer is sprayed onto an aluminium foil, pre-dried for 30 minutes at room temperature and then stoved for 30 minutes at 120° C, a claret-coloured lacquering is obtained which is distinguished by a good depth of colour and by very good fastness to overlacquering, light and weathering.

What we claim is:

1. Azo colorant of the formula

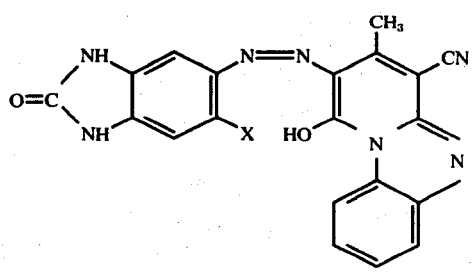

wherein X denotes H methyl or methoxy chloro.

2. Azo colorant of the formula

3. Azo colorant of the formula
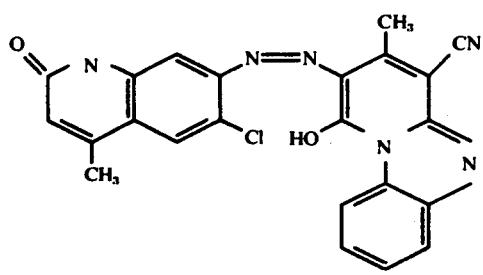
4. Azo colorant of the formula
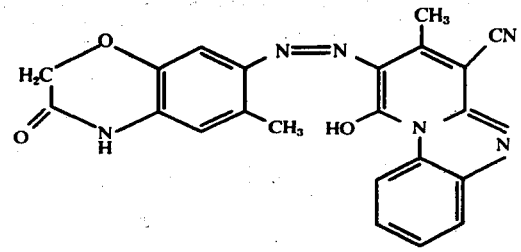
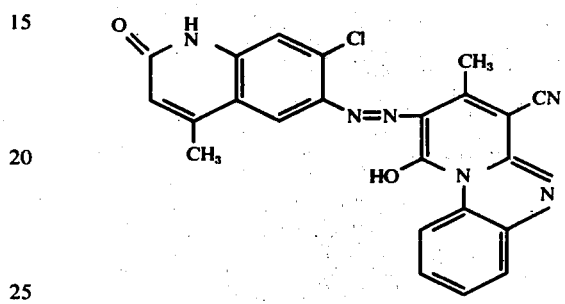
* * * * *